United States Patent
Metivier et al.

(10) Patent No.: US 7,558,298 B2
(45) Date of Patent: Jul. 7, 2009

(54) LASER DEVICE TRIGGERED BY A PHOTONIC FIBER

(75) Inventors: Philippe Metivier, Corenc (FR); Philippe Yvernault, Montrouge (FR); Sébastien Ermeneux, Talence (FR)

(73) Assignee: Eolite Systems, Pessac (FR)

(*) Notice: Subject to any disclaimer, the term of this patent is extended or adjusted under 35 U.S.C. 154(b) by 0 days.

(21) Appl. No.: 11/912,894

(22) PCT Filed: Apr. 27, 2006

(86) PCT No.: PCT/FR2006/050399

§ 371 (c)(1),
(2), (4) Date: Oct. 29, 2007

(87) PCT Pub. No.: WO2006/114557

PCT Pub. Date: Nov. 2, 2006

(65) Prior Publication Data

US 2008/0187010 A1    Aug. 7, 2008

(30) Foreign Application Priority Data

Apr. 28, 2005    (FR) .................................. 05 51114

(51) Int. Cl.
*H01S 3/30* (2006.01)
*H01S 3/117* (2006.01)
*H01S 3/10* (2006.01)

(52) U.S. Cl. ............................. 372/6; 372/13; 372/20; 372/25

(58) Field of Classification Search ..................... 372/6, 372/9, 10, 13, 20, 21, 22
See application file for complete search history.

(56) References Cited

U.S. PATENT DOCUMENTS

| 5,008,887 | A | * | 4/1991 | Kafka et al. | 372/6 |
|---|---|---|---|---|---|
| 5,708,670 | A | * | 1/1998 | Pfeiffer | 372/18 |
| 6,236,779 | B1 | * | 5/2001 | Kafka et al. | 385/31 |
| 6,831,936 | B1 | * | 12/2004 | Smart | 372/26 |
| 2005/0036525 | A1 | * | 2/2005 | Liu | 372/6 |
| 2005/0276286 | A1 | * | 12/2005 | MacCormack et al. | 372/10 |
| 2006/0120412 | A1 | * | 6/2006 | Liu | 372/6 |
| 2007/0177642 | A1 | * | 8/2007 | Liu | 372/30 |

FOREIGN PATENT DOCUMENTS

EP    0272912    6/1988

* cited by examiner

*Primary Examiner*—Minsun Harvey
*Assistant Examiner*—Phillip Nguyen
(74) *Attorney, Agent, or Firm*—Young & Thompson

(57) ABSTRACT

A device producing laser pulses of durations smaller than 30 ns, and including along its internal optical axis: a laser resonator of optical length smaller than 2 m including two reflecting ends and incorporating an MPF photonic fiber pumped continuously by at least one pump wave with laser diodes, the laser medium being a medium where the laser wave is guided and has a gain with very weak signal greater than 10 per passage, the resonator also incorporating an optical modulator. The optical modulator may deflect the internal laser axis via an electric control along two stable directions, the first direction corresponding to an axis along which the internal laser beam undergoes sufficient losses to prevent the laser effect, the second direction corresponding to an axis along which the laser beam is reflected towards itself at least partially by an optical return element.

13 Claims, 2 Drawing Sheets

LASER DEVICE TRIGGERED BY A PHOTONIC FIBER

BACKGROUND OF THE INVENTION

1. Field of the Invention

Figure 1:
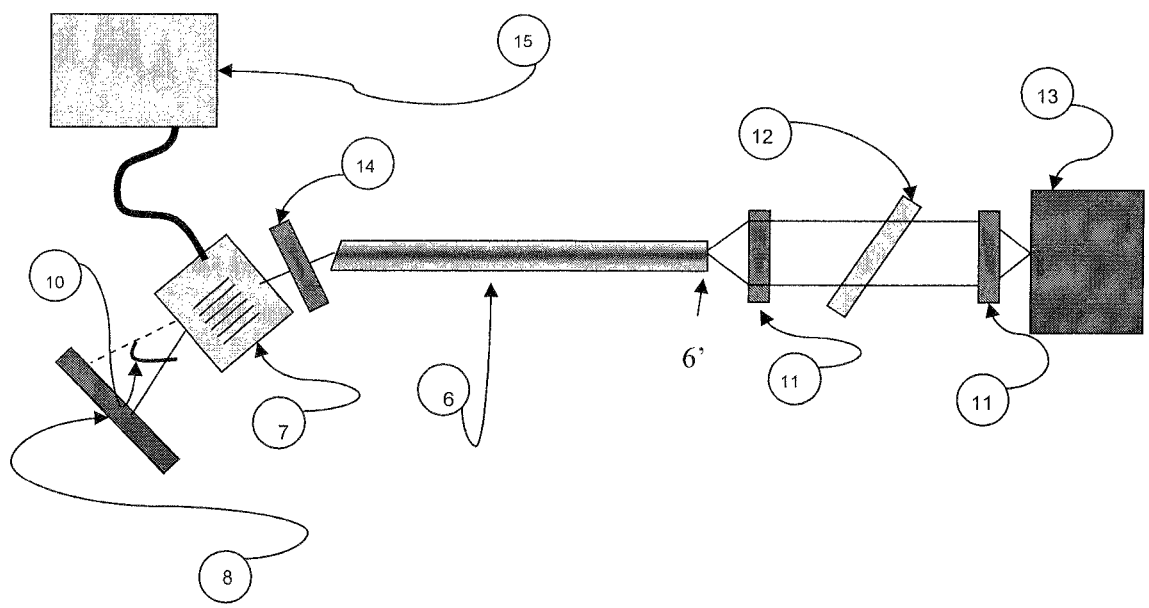

The present invention relates to a photonic fibre triggered laser device.

2. Description of the Related Art

The production principle of triggered high intensity and short duration laser pulses has been known for a long time. It consists in preventing the regenerative amplification of a wave in a cavity including a laser medium by introducing losses greater than the gain of the laser medium. After a pumping period which enables to store a significant energy in the gain medium, the optical transmission of the trigger is suddenly increased so as to enable the creation of an intra-cavity wave which is amplified very rapidly and gives rise to the emission of a light pulse. The duration of the pulses produced is conversely proportional to the gain of the laser medium, and proportional to the length of the laser cavity. Conventionally, the gain medium is a laser bar and the trigger may be an acousto-optical or electro-optical modulator. Besides, the possibility of generating very good quality and high average power light beams by using double sheath optical fibres the core is doped with an ion exhibiting a laser transition is known. These systems exhibit a relatively small active zone (typically less than 10 microns in diameter) and operate hence mainly continuously so as to prevent the faces of the fibre from being damaged by high energy laser pulses (damage threshold approx. 20 to 50 $J/cm^2$ for 10 ns-pulses).

Laser fibres with photonic layers or MPF (for multiclad photonic fibre) are also known and have been presented in the article by J. Limpert, N. Deguil-Robin, I. Manek-Hönninger, F. Salin, F. Röser, A. Liem, T. Schreiber, S. Nolte, H. Zellmer, A. Tünnermann, J. Broeng, A. Petersson, and C. Jakobsen, "High-power rod-type photonic crystal fiber laser," Opt. Express 13, 1055-1058 (2005). MPF lasers include optical amplifiers with glass fibre formed of a doped core and of at least one peripheral sheath ensuring the guiding of a produced wave. The core is doped by a rare earth ion, neodymium or ytterbium generally. The guiding is ensured by the implementation of a photonic structure obtained by a geometrical assembly of channels or aerial capillaries (holes). This structure lowers artificially the index encountered by the wave produced and enables mono-mode propagations for fibre core diameters of the order of 50 μm. This large core diameter enables to spread the energy of the wave produced over a greater surface and to push back both fundamental limitations of fibre amplifiers, i.e. flow handling and non-linear effects. With such a technology it may be contemplated to generate relatively short laser pulses from 1 ns to 30 ns with energies of the order of 1 mJ to 10 mJ.

These MPF lasers may exhibit extremely high gains thanks to the very high confinement of the gain zone. Such confinement imposes conventionally a great absorption length and a high limitation in the energy produced by triggering. However it is very difficult to maintain losses greater than the gain during the pumping period. We have still been able to show that particular photonic fibres could be used for simultaneously diminishing the absorption length and increasing the size of the active zone. Limpert et al (Conference on Advanced Solid State Photonics, Vienna, February 2005) have used one of these fibres so as to generate high energy nanosecond pulses. Nevertheless, they resorted to a very rapid triggering (<5 ns) using a Pockels cell so as to block the cavity during the pumping phase. The laser is then limited to rates of the order of 100 kHz and the triggering system is particularly costly. Moreover the system is sensitive to the polarisation of the wave propagating in the resonator and its efficiency may be diminished by the de-polarisation during the propagation through the fibre.

SUMMARY OF THE INVENTION

The present invention enables to generate very short pulses (<30 ns), while maintaining a beam quality close to the diffraction limit and very high average powers (>50 W, possibly several hundred W). To do so, a laser fibre with photonic layers, so called MPF («Multiclad Photonic Fiber») is used preferably associated with an acousto-optical modulator operating in a particular configuration.

Thus, The invention relates to a device for cyclically generating short duration laser pulses, the device including a laser resonator of optical length smaller than 2 m including two reflecting ends and incorporating a laser medium pumped continuously by at least one pump wave derived from power semi-conductive laser diodes focussed by collimation optical means in one end of the laser medium, the laser medium being a medium where an internal laser beam is guided and having a gain with very weak signal greater than 10 per passage through the gain medium, the laser resonator also incorporating an optical modulator.

The short duration laser pulses are approximately smaller than 30 ns.

According to the invention, the optical modulator is able to deflect the axis of the internal laser beam, said optical modulator is actuated by an electric control, along two stable directions, the first direction corresponding to an axis along which the internal laser beam undergoes sufficient losses to prevent the laser effect from being triggered, the device then being in an open cavity mode, and the second direction corresponding to an axis along which the internal laser beam is reflected towards itself at least partially by an optical return means closing the resonator at a first one of its ends, the device then being in a closed cavity mode, the second end of the laser resonator being closed by a means at least partially reflecting situated on the other side of the amplifying medium, the modulator possessing a switching time greater than the time taken by light to travel through the cavity, and it is used in a configuration where the loss factor introduced in the state corresponding to the open cavity mode is greater than the gain with very weak signal of the resonator.

In various embodiments of the invention, the following means may be used on their own or according to all technically possible combinations, are used:

- the laser medium is an MPF photonic fibre,
- the modulator is an acousto-optical modulator,
- the modulator ensures directly the closing of the resonator in activated mode,
- the first direction corresponds to an axis along which the internal laser beam undergoes sufficient losses to prevent the laser effect from being triggered (locked mode), the device then being in an open cavity mode, and the modulator is then not activated,
- the second direction corresponds to an axis along which the internal laser beam is reflected towards itself at least partially by an optical return means used for closing the resonator at a first one of both its ends, the device then being in a closed cavity mode, and the modulator being activated,
- the optical return means used for closing the resonator is positioned so that the angle formed by its normal and the laser beam at the output of the non-activated modulator is equal to the angle between the order 0 and the order 1 or −1 of the acousto-optical modulator, the optical return means used for closing the resonator is a reflecting treatment for the laser wave on the output face of the optical modulator, the modulator draws practically no electrical control energy during the locked mode of the laser, (also called pumping mode or non-triggered mode)

the modulator is mechanical and it acts by moving mechanically an optical means, the modulator includes means using the variation in reflectivity of an initially transparent element, the means using the variation in reflectivity enable to increase the reflectivity by exciting a longitudinal acoustic wave whereof the propagation axis is co-linear with the axis of the resonator, the device is monolithic, the members of the optical cavity being of silica and/or of glass and being attached to one another, into the monolithic optical cavity, the first end of the fibre is perpendicular to the normal to the longitudinal axis of the fibre, into the monolithic optical cavity, a collimation lens is arranged between the first end of the fibre and the optical modulator, the pump wave is produced by at least one laser diode and is focussed by collimation optical means into the second end of the fibre, the laser wave is extracted at output of the device by a dichroic mirror arranged between the optical collimation means, the device includes means so that the produced pulsed laser radiation is polarised linearly, the amplifying medium preserves the state of polarisation, the modulator inserted a different loss on two states of polarisation, the assembly comprising the modulator and the fibre preserves the polarisation, the device is pumped by a laser diode device of continuous power, fibred or not fibred, the coupling of the pump with the resonator takes place thanks to an optical collimation device or by coupling a fibred element, the average power is at least 10 W, the average power is preferably at least 50 W, the device includes comprises means enabling to generate laser pulses of duration ranging between 1 ns and 30 ns at rates above 50 kHz, with a guided amplifying medium ensuring a beam quality at laser output better than 1.5 times the diffraction, the peak power of the device is at least 33 kW, (average power >50 W, rate greater than 50 kHz, pulse duration smaller than or equal to 30 ns), the peak power of the device is typically greater than 50 kW (the peak power is the power measurable directly on the wave at output of the laser cavity), the device includes means for generating a harmonic radiation with non-linear crystals, the device includes means for generating new time frequencies using non-linear effects of the 3rd order, in particular a photonic fibre, the device includes means for generating spectra covering a band vastly greater than 10 nm and which may reach several hundred nanometers, a collimation lens is arranged between the first end of the fibre and the optical modulator.

the first end of the fibre includes an anti-reflecting means for the laser wave, the first end of the fibre is tilted relative to the normal to the longitudinal axis of the fibre, the tilting angle of the first end of the fibre relative to the normal to the longitudinal axis of the fibre is greater than the numerical aperture of the core of the fibre and ranges between 1° and 60°, the tilting angle of the first end of the fibre relative to the normal to the longitudinal axis of the fibre is approximately 8°, the anti-reflecting means is an insert added to the first end of the fibre, the anti-reflecting means is an anti-reflecting treatment of the first end of the fibre, the laser includes a ring-like resonator wherein the laser wave does not travel exactly the same path in the outward and the return paths.

The laser of the invention is a triggered pulse laser, with high gain and guided mode (with MPF fibre) which has a short pulse duration and uses a simple opto-electronics triggering means whereof the triggering time is not critical for the pulse duration and may be greater than the laser pulse duration.

BRIEF DESCRIPTION OF THE DRAWING FIGURES

Figure 2:
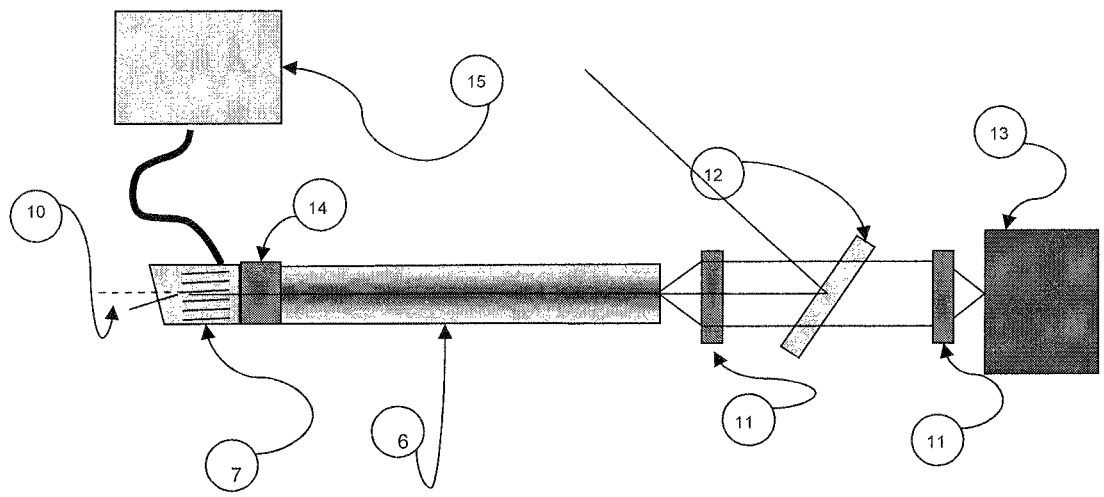
Figure 3:
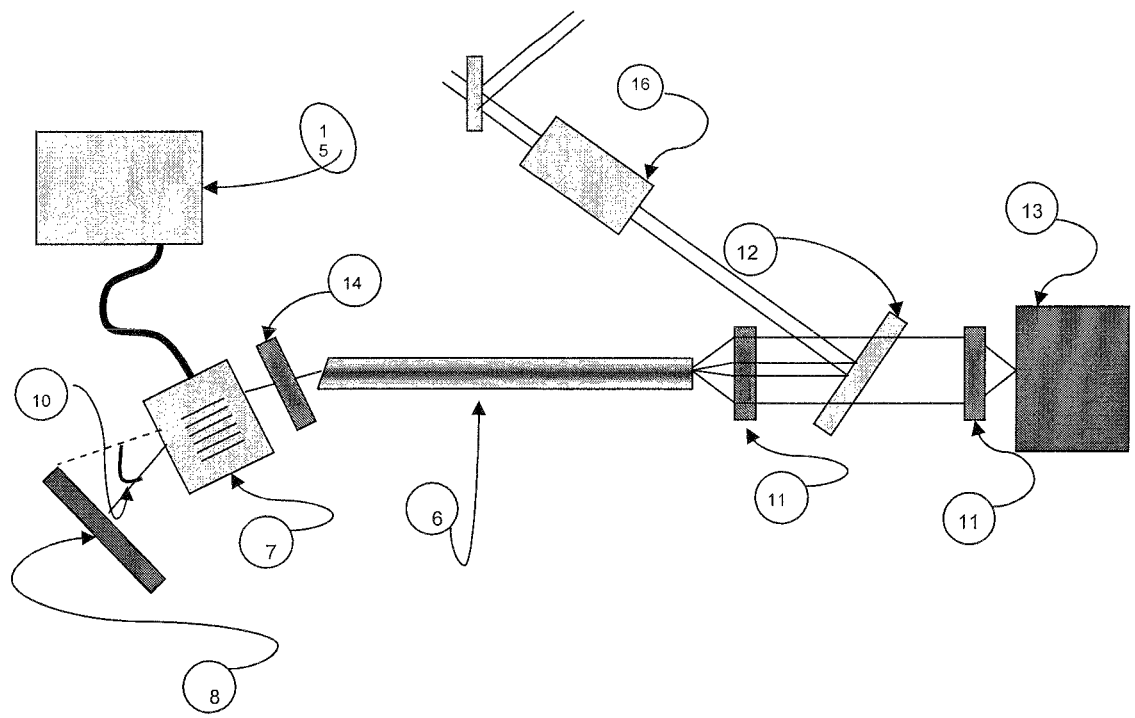

The present invention will now be exemplified without being limited thereto with the following description in relation with the Figures below:

FIG. 1 which represents diagrammatically a triggered laser device with MPF fibre according to the invention, FIG. 2 which represents an example of embodiment of the triggered laser device of the invention, FIG. 3 which represents an application of the device of the invention.

DETAILED DESCRIPTION OF THE INVENTION

On FIG. 1, a laser resonator is formed between a reflecting mirror 8 at the laser transmission wavelength and a planar end 6' of an MPF photonic fibre 6. The second end de the MPF fibre is cut or polished so as to form an angle typically 8° (between 1° and 60°) with the longitudinal axis of the fibre. The light beam emerging from the tilted end side fibre is collimated using a lens 14 on an acousto-optical modulator 7. This light beam is then incident on the acousto-optical modulator 7 which may produce at output at least two different angular paths for the beam. The modulator 7 is activated at the desired shooting rate by an electronic module 15, which controls a high frequency acoustic wave created in the modulator during the activation. The mirror 8 is positioned so that its normal forms an angle Θ 10 corresponding to the angle between the incident beam on the modulator (and which corresponds to the output beam with a non-activated modulator) and the diffracted beam according to the order 1 or −1 in the activated modulator.

The MPF fibre is pumped continuously and longitudinally by a pump wave derived from one or several power laser diodes 13, wherein the pumping diode(s) are preferably fibred. The pump wave is focussed into the MPF fibre on the non-tilted end side, thanks to collimation optical means 11, in particular by lenses corrected from spherical aberrations (doublets, triples or aspherical lenses . . . ). Throughout the pumping phase, the supply of the electronic module 15 is held at rest and the latter does not produce any control signal and the modulator then behaves like a block of transparent, isotropic material. The light beam derived of the MPF fibre then runs through it without being deviated and hits the mirror 8 while forming an angle θ with the normal to the mirror and it is hence not returned towards itself and may not consequently return into the fibre. To trigger a laser transmission the electronic module 15 is activated which causes the creation of an acoustic wave in the modulator 7. This acoustic wave causes a deflection in the incident beam coming from the MPF fibre by an angle θ which makes is come up perpendicular to the mirror 8 and the beam is then returned towards itself and may be amplified into the MPF fibre.

The face 6' of the fibre, opposite to the tilted face of the fibre, operates as a second mirror, partially reflecting, and causes a resonance effect which gives rise to the laser effect and hence the production of a light pulse. A laser beam including pulses at a determined rate by the activation of the electronics module 15 is hence transmitted through the face of the MPF fibre and is separated from the pumping beam by a dichroic mirror 12.

The spatial quality of the pulse beam thus produced is determined by the properties of the MPF fibre and may hence be very close to the diffraction limit.

An MPF fibre with a core diameter of the order of 50 μm may for instance be used. A double clad fibre structure including a wave guiding sheath exhibiting a section whereof the surface ranges between 10,000 and 250,000 square microns may for instance be used, the amplifying medium having a length/diameter radio of high section: the surface of the section ranging between 500 and 10,000 square microns and the length of the amplifying medium ranging between 10 cm and 1.5 m. The amplifying medium of the fibre possesses preferably a gain with very weak signal typically greater than 10 per passage through the gain medium. The structure of the fibre enables the guiding of the laser wave in the amplifying medium.

The gain into the fibre being very large (greater than 10 and typically greater than 100 per passage), the duration of each pulse is determined by the duration of one go-and-return travel into the laser cavity and not by the rising time of the modulator. Thanks to the configuration suggested with a fibre short MPF (length smaller than 2 m and preferably smaller than 1 m), pulses of a duration smaller than 10 ns may be produced with a modulator whereof the response time is greater than 100 ns. To do so, it is necessary to guarantee that the losses remain very high during the pumping period (otherwise the laser effect would be take place independently from the triggering). Triggering the laser on the first diffraction order of the acousto-optical module and pumping mainly when the acousto-optical module is non activated enables to guarantee that the cavity will remain open (no looping possible) in the absence of a control signal on the modulator. In active mode, the very large gain of the fibre compensates largely for the losses induced by the fact that the modulator will work with a diffraction efficiency smaller than 100%, conversely in passive mode the acousto-optical module behaves like a passive optical component and a loss factor vastly greater than 100 may be guaranteed (with for instance a spurious return rate of the order of 2 per thousand).

It can be seen that the association of an acousto-optical modulator operating on the order 1 or −1 and of a wide mode photonic fibre enables to guarantee the production of short pulses, energetic and with an excellent beam quality, while operating at high average power.

For an optimum operation, a number of conditions should be respected. In particular, the lens on the tilted end side of the MPF fibre must be selected and located so as to ensure that the divergence of the beam having traveled through it from the fibre is lower than the deflecting angle θ introduced by the acousto-optical modulator. Similarly, it is preferable that the end of the fibre facing the modulator, i.e. the tilted end, is prepared in order to prevent any laser oscillation between both ends of the fibre. To do so, it can be given a tilting with an angle relative to the normal to the fibre which is largely greater than the numerical aperture of the core of the MPF fibre. Alternately or additionally, one may assemble on the end of the fibre, on the modulator side, an insert whereof the external face (output) is not perpendicular to the axis of the fibre or which has received an anti-reflecting treatment. Similarly, for obtaining short pulses, the fibre must have a length smaller than 1 m so as to guarantee pulses of duration smaller than 10 ns.

More generally, the modulator may use any other method for rapid modulation of the transmission or of the reflection of an optical system. By way of example, a micro-mechanical optical system enables to obtain the angular optical switching effect necessary to the triggering of the pulse. Preferably, in the latter case, the return mirror 8 is carried by the micro-mechanical optical system and may toggle to switch from a return position of the light beam towards itself to another position.

It should be noted that the switching times of the modulator must be rapid (typically smaller than a few hundred ns) without having to be quicker than the duration of one go-and-return travel duration into the laser cavity since the duration of the pulses is determined by the gain of the amplifying medium and not by the switching speed of the switch.

Similarly, it is important to understand that the laser medium having in the invention a very high gain per passage (greater than 10), the simple activation of most optical modulators does not enable to introduce in the cavity sufficient losses to prevent the laser effect. The laser emission cannot be frustrated any longer nor be forced to appear in the form of a pulse. It is therefore important in the invention to use a non-activated modulator during the phase of storing the energy in the laser medium, while making sure that the beam running through the modulator without being modified since the latter is not activated, cannot be returned towards the amplifying medium. This operating mode is opposite to the cavity triggering operations used in the assembly of the laser systems described before this invention, systems which uses traditionally the modification brought about by an activated modulator to lock the laser cavity during the storage phase, and which triggers the emission of a pulse while bringing the modulator to its non-activated state during a short time against the complete cycle (a configuration which then minimises the losses In the case of a small gain laser).

In an alternate advantageous embodiment (or complementary to the preceding for pumping by both ends of the MPF fibre), the pump signal is incident on the MPF fibre by its end directly in relation to the modulator. In such a case the modulator may be run through by the pump wave or simply separated from the latter by a dichroic mirror arranged between the end (tilted, anti-reflection treated or including an insert) of the fibre 6 or the lens 14 and the modulator 7, enabling the longitudinal injection of the pump wave into the MPF fibre.

It is possible to provide the device essentially in a monolithic fashion by grouping the main elements of the optical cavity, in particular the collimation optics 14, the modulator 7 and the mirrors 8, 6', in a material of silica or in a glass which enables such an assembly. FIG. 2 gives an example of such a monolithic assembly. In case when the modulator is an acousto-optical modulator, the external face of the modulator can be cut so that it forms an angle θ with the axis of the fibre and treat this face so as to make it reflecting to the laser wavelength for obtaining an equivalent of the mirror 8 on this face.

Besides, the device of the invention may be followed very advantageously by one or several non-linear crystals 16 so as to generate harmonic radiations of the fundamental wave (in particular pour doubling, tripling, quadrupling, quintupling the frequency). The association of short pulses and of a beam limited by the diffraction enables to maximise the throughput of frequency conversion and hence to generate visible or UV radiations of very high average power, which is difficult to obtain by the usual means. An example of implantation of one or several non-linear crystals followed by dichroic mirrors pour the separation of the harmonics is represented on FIG. 3. The generation of harmonics is also possible with a monolithic device such as represented on FIG. 2 while associating non-linear crystals thereto.

It should be understood that other arrangements of the elements of the triggered laser device are possible without departing from the framework of the invention presented here.

The invention claimed is:

1. A device for cyclically generating short duration laser pulses typically smaller than 30 ns, the device comprising:
a laser resonator of optical length smaller than 2 m including two reflecting ends and incorporating a multi-clad photonic fiber (MPF) pumped continuously by at least one pump wave derived from power semi-conductive laser diodes focused by optical means for collimating the fiber, the MPF fiber including a medium where an internal laser beam is guided and having a gain with very weak signal greater than 10 per passage through the gain medium, the laser resonator also incorporating an optical modulator, the optical modulator being able to deflect the axis of the internal laser beam, said optical modulator is actuated by an electric control, along two stable directions, the first direction corresponding to an axis along which the internal laser beam undergoes sufficient losses to prevent the laser effect from being triggered, the device then being in an open cavity mode, and the second direction corresponding to an axis along which the internal laser beam is reflected towards itself at least partially by an optical return means closing the resonator at a first one of its ends, the device then being in a closed cavity mode, the second end of the laser resonator being closed by a means at least partially reflecting situated on the other side of the amplifying medium, wherein the device generates a peak power of at least 33 KW, and that the modulator possesses a switching time greater than the time taken by light to travel through the cavity and that it is used in a configuration, where the loss factor introduced in the state corresponding to the open cavity mode is greater than the gain with very weak signal of the resonator and in that the amplifying medium preserves the state of polarisation.

2. A device according to claim 1, wherein the modulator ensures directly the closing of the resonator in activated mode.

3. A device according to claim 1, wherein the optical modulator is an acousto-optical modulator.

4. A device according to claim 3, wherein the optical return means used for closing the resonator is positioned so that the angle formed by its normal and the laser beam at the output of the non-activated modulator is equal to the angle between the order 0 and the order 1 or −1 of the acousto-optical modulator.

5. A device according to claim 3, wherein the acousto-optical modulator draws practically no electrical control energy during the locked mode of the laser.

6. A device according to claim 1, wherein the device is monolithic, the members of the optical cavity being made of silica and/or of glass and being attached to one another.

7. A device according to claim 1, wherein the optical modulator is mechanical and that it acts by moving mechanically an optical means.

8. A device according to claim 1, wherein the device comprises means enabling to generate laser pulses of duration smaller than 30 ns at rates above 50 kHz with a beam quality better than 1.5 times the diffraction.

9. A device according to claim 1, wherein one of the ends of the MPF fiber is tilted relative to the normal to the longitudinal axis of the fiber.

10. A device according to claim 1, wherein the MPF fiber is pumped at both its ends.

11. A device for cyclically generating short duration laser pulses, typically smaller than 30 ns, the device comprising:
a laser resonator of optical length smaller than 2 m including two reflecting ends and incorporating a multi-clad photonic fiber (MPF) pumped continuously by at least one pump wave derived from power semi-conductive laser diodes focused by optical means for collimating the fiber, the MPF fiber including a medium where an internal laser beam is guided and having a gain with very weak signal greater than 10 per passage through the gain medium, the laser resonator also incorporating an optical modulator, the optical modulator being able to deflect the axis of the internal laser beam, said optical modulator is actuated by an electric control, along two stable directions, the first direction corresponding to an axis along which the internal laser beam undergoes sufficient losses to prevent the laser effect from being triggered, the device then being in an open cavity mode, and the second direction corresponding to an axis along which the internal laser beam is reflected towards itself at least partially by an optical return means closing the resonator at a first one of its ends, the device then being in a closed cavity mode, the second end of the laser resonator being closed by a means at least partially reflecting situated on the other side of the amplifying medium, wherein the modulator possesses a switching time greater than the time taken by light to travel through the cavity, and that it is used in a configuration where the loss factor introduced in the state corresponding to the open cavity mode is greater than the gain with very weak signal of the resonator, in that the amplifying medium preserves the state of polarisation, and in that it includes means for generating harmonic radiation with non-linear crystals.

12. A device according to claim 4, wherein the acousto-optical modulator draws practically no electrical control energy during the locked mode of the laser.

13. A device according to claim 2, wherein the optical modulator is mechanical and that it acts by moving mechanically an optical means.

* * * * *